(12) United States Patent
Fruit et al.

(10) Patent No.: US 7,526,268 B2
(45) Date of Patent: Apr. 28, 2009

(54) METHOD AND SYSTEM FOR SELECTIVELY PROCESSING TRAFFIC INCIDENT INFORMATION

(75) Inventors: Larry J. Fruit, Kokomo, IN (US); J. Robert Dockemeyer, Jr., Kokomo, IN (US); Daniel W. Farrow, Noblesville, IN (US); Wilbur A. Robarge, Greentown, IN (US); Bradley E Boyer, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 154 days.

(21) Appl. No.: 10/946,837

(22) Filed: Sep. 22, 2004

(65) Prior Publication Data

US 2006/0063559 A1    Mar. 23, 2006

(51) Int. Cl.
*H04M 11/04*    (2006.01)
*H04M 3/42*    (2006.01)
*H04W 4/00*    (2006.01)
*G08G 1/123*    (2006.01)
*G01C 21/00*    (2006.01)

(52) U.S. Cl. ............... 455/404.2; 340/988; 455/404.1; 455/414.1; 455/427; 701/200

(58) Field of Classification Search ............... 340/988, 340/989, 990, 991, 992, 993, 994; 455/404.1, 455/404.2, 404.3, 404.4, 414.1, 427; 701/200, 701/201, 202, 208, 209, 210, 211, 213
See application file for complete search history.

(56) References Cited

U.S. PATENT DOCUMENTS

| 6,208,932 | B1 | 3/2001 | Ohmura et al. |
| 6,266,608 | B1 | 7/2001 | Pertz |
| 6,603,033 | B2 * | 8/2003 | Woo ............... 556/40 |
| 6,606,033 | B1 * | 8/2003 | Crocker et al. ............ 340/901 |
| 6,731,940 | B1 * | 5/2004 | Nagendran ............ 455/456.1 |
| 2003/0112133 | A1 * | 6/2003 | Webb et al. ............ 340/436 |
| 2005/0096842 | A1 * | 5/2005 | Tashiro ............ 701/210 |
| 2005/0149250 | A1 * | 7/2005 | Isaac ............ 701/200 |
| 2006/0046649 | A1 * | 3/2006 | Videtich ............ 455/12.1 |
| 2006/0057956 | A1 * | 3/2006 | Grau et al. ............ 455/3.02 |

FOREIGN PATENT DOCUMENTS

| DE | 44 45 582 | 2/1998 |
| EP | 0 829 837 | 3/1998 |

OTHER PUBLICATIONS

European Search Report dated Dec. 14, 2005.

* cited by examiner

*Primary Examiner*—Alexander Eisen
*Assistant Examiner*—Matthew W Genack
(74) *Attorney, Agent, or Firm*—Jimmy L. Funke

(57) ABSTRACT

A method includes receiving current location and heading information, receiving threshold range, and bearing values, receiving an incident report corresponding to a traffic incident at a location of interest, and selectively retaining the incident report if the point of interest is within the threshold range and bearing values.

20 Claims, 4 Drawing Sheets

METHOD AND SYSTEM FOR SELECTIVELY PROCESSING TRAFFIC INCIDENT INFORMATION

BACKGROUND OF THE INVENTION

Users listen to radio broadcasts in a number of settings, including from within their vehicles. The content of these broadcasts may include a variety of news, traffic, information, and/or music. In the past, a user's reception of radio broadcasts was limited by the geographical area of where the user was located. For example, when a user passed between geographical regions, the radio signals often became attenuated to the point that the radio broadcast lost clarity or was lost altogether.

In recent years, satellite radio has emerged as a new broadcasting source. Satellite radio broadcasts are transmitted using satellites that orbit the earth instead of the land based antennas associated with conventional broadcasting means. These transmissions are broadcast in a digital format, which enhances the quality of the broadcast received by radio users. The use of a satellite reduces and often eliminates the geographical limitations common to conventional radio broadcasts and allows for transmission of radio broadcasts across broad geographical regions, such as across the entire continental United States.

In addition to the elimination of geographical restrictions, satellite broadcasting typically includes a broad array of programs or listening selections. However, while providing a broad choice of listening selections, the broadcast of a signal across a broad geographical region complicates the reception and processing of locally relevant information such as traffic incidents or other geographically relevant information.

Currently, geographically relevant information concerning traffic is frequently transmitted using conventional radio broadcasts over an existing system. The data messages are delivered via public broadcast using the VHF and FM frequency bands that are known as the Radio Data System Traffic Management Channel (RDS-TMC). Recent efforts have been directed to implementing a similar system for a satellite radio system. However, these efforts are limited by the complexity of providing useful information to users at a given location via a signal transmitted across a broad geographical area.

SUMMARY OF INVENTION

The present system and method allows for the selective processing of incident reports, such as traffic accidents, contained within traffic incident information. One exemplary method includes receiving current location and heading information, receiving threshold range and bearing values, receiving an incident report corresponding to a traffic incident at a point of interest, and selectively retaining the incident report if the point of interest is within the threshold range and bearing values. This determination may be made by a traffic incident filter, which may be part of a traffic management system. This configuration allows for decreased memory and processor requirements, thereby reducing the cost of such a system.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

DETAILED DESCRIPTION OF THE PREFERRED EMBODIMENTS

Figure 1:
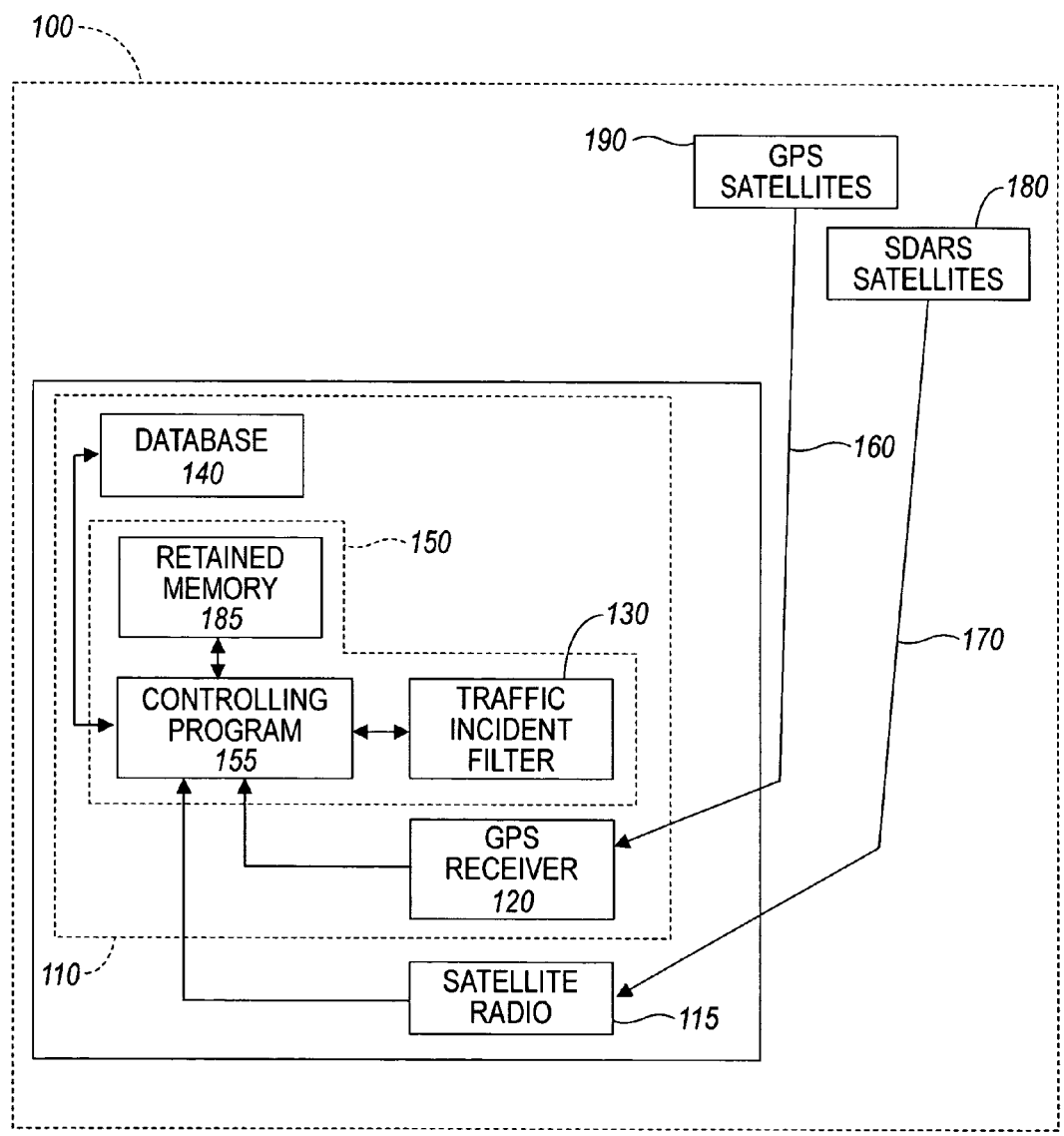
FIG. 1 illustrates a simple schematic of an exemplary satellite radio system that includes an exemplary traffic management system.

The exemplary traffic incident filter described herein may be used with satellite radio systems that include traffic management systems. The traffic incident filter allows the traffic management system to present only geographically relevant traffic incident information to the user through the satellite radio system. This configuration reduces the processor and/or memory requirements of the traffic management system, and thus the cost of implementing such a system. However, it should be noted that, for purposes of the embodiments disclosed herein, instead of presenting traffic incident information to the user, the traffic incident filter and the embodiments disclosed herein may be used to present any information pertinent to the user. Such pertinent information is not limited, and may include items such as the location of restaurants, rest stops or any other information pertinent to the user. For clarity, however, an example relating to traffic incidents is used in connection with the embodiments described below. Such description is not intended to limit the embodiments to only traffic incidents.

The traffic management system receives information related to traffic incidents across a broad geographical region. This traffic incident information includes the location of each traffic incident for all of the geographical region. The location of a particular traffic incident may be referred to as a point of interest. The system uses range and bearing threshold values in determining whether traffic incident information is relevant. For example, some traffic incidents are simply too distant to be of interest. In addition, some traffic incidents, while they may be within a distance that may be of interest, may nevertheless be irrelevant because they are not relevant to the direction or heading the user is taking. These values may be established in a number of ways, including presetting the values in the system or receiving the values from a user. These values are then used by the traffic incident filter to determine whether traffic incident information is geographically relevant.

The traffic incident filter uses a filter algorithm to determine whether information related to a given traffic incident at its corresponding point of interest should be retained or discarded. The filter algorithm determines the relationship between the current location and heading and the point of interest. The algorithm then determines whether the point of interest is within the threshold range and bearing values. If the point of interest is within the threshold range and bearing values, the filter algorithm provides an indication to the traffic management system that the information should be retained. The satellite radio system is then able to use the geographically relevant information in providing route planning, navigation, or other functions to a user.

An exemplary satellite radio system will first be discussed. This discussion will include details of an exemplary traffic management system. Two exemplary applications of threshold values will then be discussed, explaining how zones of interest are defined by the threshold values and illustrating visually the operation of the traffic incident filter. An exemplary filter algorithm used by an exemplary traffic incident filter will then be described, showing the procedural operation of the traffic incident filter.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

FIG. 1 is a schematic view of a satellite radio system (100) that includes an exemplary traffic management system (110) and a satellite radio receiver (115). The satellite radio receiver (115) receives satellite radio broadcasts (170) according to well-known methods. In addition to receiving satellite radio broadcasts (170), the system (100) receives information related to traffic incidents. As will be discussed in more detail below, the traffic management system (110) retains only incident information relevant to the user.

The traffic management system (110) includes a global positioning satellite (GPS) receiver (120), a traffic incident filter (130), a database (140), and a processor (150) with a controlling program (155) residing thereon. The traffic management system (110) receives GPS information (160) from GPS satellites (190) and traffic incident information (170) from SDARS (Satellite digital audio radio service) satellites (180). If the traffic incident filter (130) determines information pertaining to a given traffic incident is to be retained, the information is passed to the controlling program (155) and subsequently stored in retained memory (185). The processor (150) is then selectively able to access the retained memory (185) when prompted by a user.

Accordingly, the traffic incident filter (130) allows the traffic management system (110) to present only meaningful information to the user by accepting only geographically meaningful information and rejecting undesired information. In particular, the incident filter (130) uses system location and heading information received from the GPS module (120) and threshold values to determine whether traffic incident information is relevant. The processing of the GPS information (160) will first be discussed, followed by a discussion of the traffic incident information (170) and how the incident filter uses this information.

The GPS module (120) processes the GPS information (160) to determine the current position and heading of the user within the system (100). The exemplary GPS module (120) shown in FIG. 1 processes the GPS information (160) to determine current location in terms of latitude and longitude, wherein latitude is positive north of the equator and longitude is positive east. The GPS module (120) also determines the current heading in terms of azimuth, with the positive direction being clockwise relative to zero degrees north. Once the GPS information has been processed to determine the current position and heading of the vehicle, this information is then passed to the controlling program (155) which in turn conveys the information available to the incident filter (130).

The controlling program (155) also conveys threshold values to the traffic incident filter (130). These threshold values may include a threshold distance and a threshold bearing angle. The application of several exemplary threshold values will be discussed in more detail with reference to FIGS. 2 and 3. The traffic incident filter (130) uses the threshold location and bearing information values from the calling program to determine whether information related to a given traffic incident should be preserved in retained memory (185) or whether the information should be discarded.

The traffic incident information (170) is received by the controlling program (155) and the corresponding location of each incident is processed by the traffic incident filter (130). For example, the traffic incident information (170) may be information conveyed to the traffic incident filter (130) via a traffic message channel (TMC), which includes information about the location of incidents across a broad geographical region. Information about each individual incident may be characterized by the location of the incident, or the point of interest and other information in the form of individual incident reports.

For example, the information transmitted over an exemplary TMC includes traffic incident information (170) for the entire USA in a pre-assigned frequency broadcast channel. This information is conveyed using a "virtual language" in which the codes broadcasted over the air corresponds to information stored in the database (140). The traffic incident filter (130) processes the location information of each incident report to determine whether the information related to that incident should be retained or discarded.

If the incident report is not geographically relevant, the traffic incident filter (130) tells the controlling program (155) to discard the information. If the incident report is to be retained, the information is stored in retained memory (185). The information in the incident report corresponds to information stored on the database, such as lists of weather and traffic situations, advice, duration, and other information. This information also incorporates lists of locations, including intersections, road numbers, and place names. When the processor (150) receives a command to process the incident report contained in the retained memory (185), it uses the "virtual language" contained therein to access the relevant information on the database and outputs the relevant information.

Accordingly, the traffic incident filter (130) uses current location and range information and threshold values to determine whether each incident report contained in the traffic incident information is relevant and should be retained or whether the incident report is irrelevant and should be discarded. This configuration minimizes the processor and memory requirements of the traffic management system, while allowing for the benefits of satellite radio systems. Consequently, the traffic incident filter (130) provides for a more efficient and less expensive traffic management system and/or radio system that includes the same. Further, as previously discussed, the threshold values may be preset values, values determined by the controlling program based on current speed, past selections, or other criteria that are selected by the user.

Figure 2:
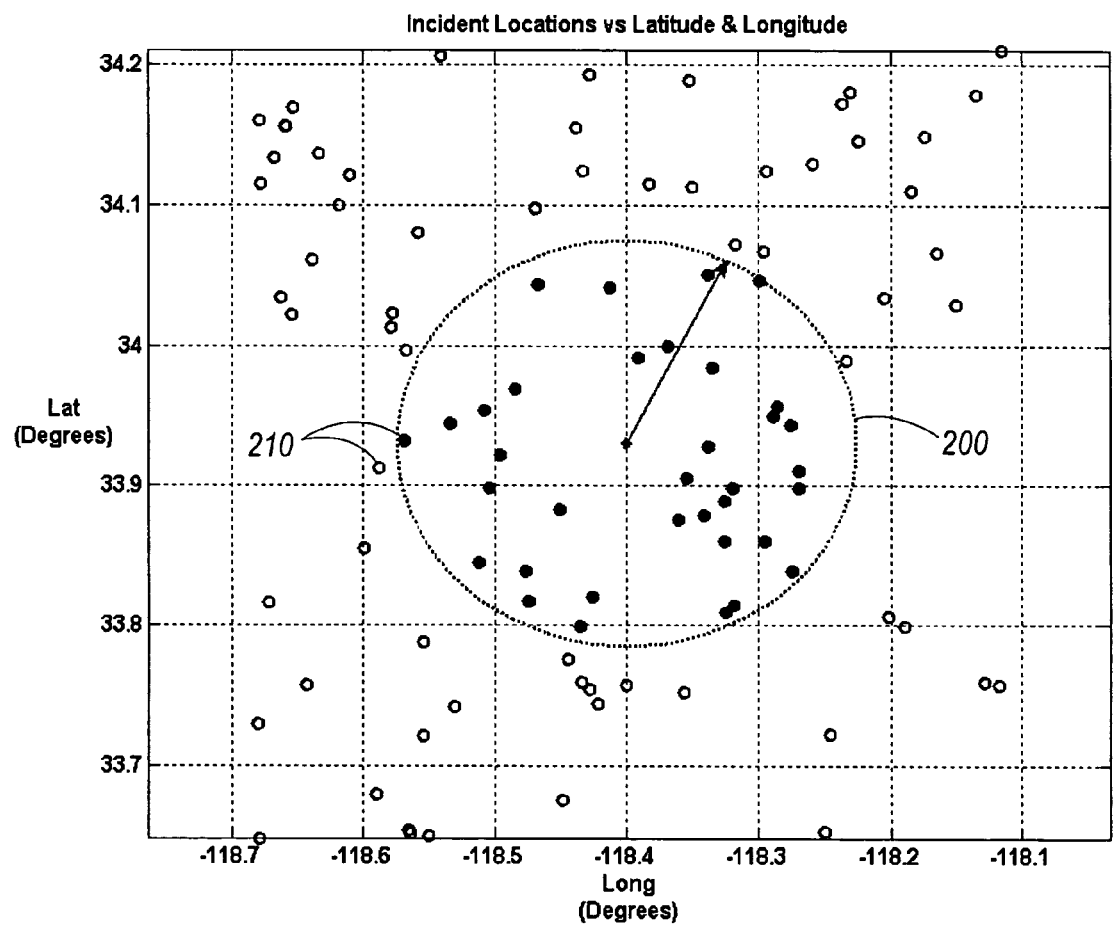
FIG. 2 illustrates an application of a set of exemplary threshold values to define an exemplary zone of interest.

An application of an exemplary threshold value is shown in FIG. 2. FIG. 2 illustrates a geographical area of approximately 40 miles by 40 miles wherein a zone of interest (200) is shown. The mobile system is illustrated in FIG. 2 as moving in a heading of approximately 30 degrees. Further, the locations of several individual traffic incidents as represented by points of interest (210) are shown across the geographical area. The traffic incident filter 130 (See FIG. 1) receives the incident report for each of these incidents (210), as well as all the other incidents contained within a broader geographical area, such as across the USA. The traffic incident filter (130) uses threshold values to establish the zone of interest (200). The threshold values applied in FIG. 2 include a range threshold value of 10 miles and a bearing threshold of +/−180 degrees. As a result, the zone of interest (200) defined by the threshold values forms a circle with a radius of 10 miles.

The traffic incident filter (130) uses the location and bearing information and the threshold values passed thereto from the controlling program (155) to determine whether each incident report should be retained. If the traffic incident filter (130) determines that the incident report, which is represented by a point of interest (210), is within the range and bearing thresholds, the traffic incident filter (130) directs the controlling program (155) to retain the information. The incident reports that are retained are visually represented by points of interest (210) with full circles that fall within the zone of interest (200). Similarly, those incidents which are outside of either the range or bearing threshold are discarded. These incidents are visually represented by points of interest (210) with hollow circles that fall outside of the zone of interest (200).

Figure 3:
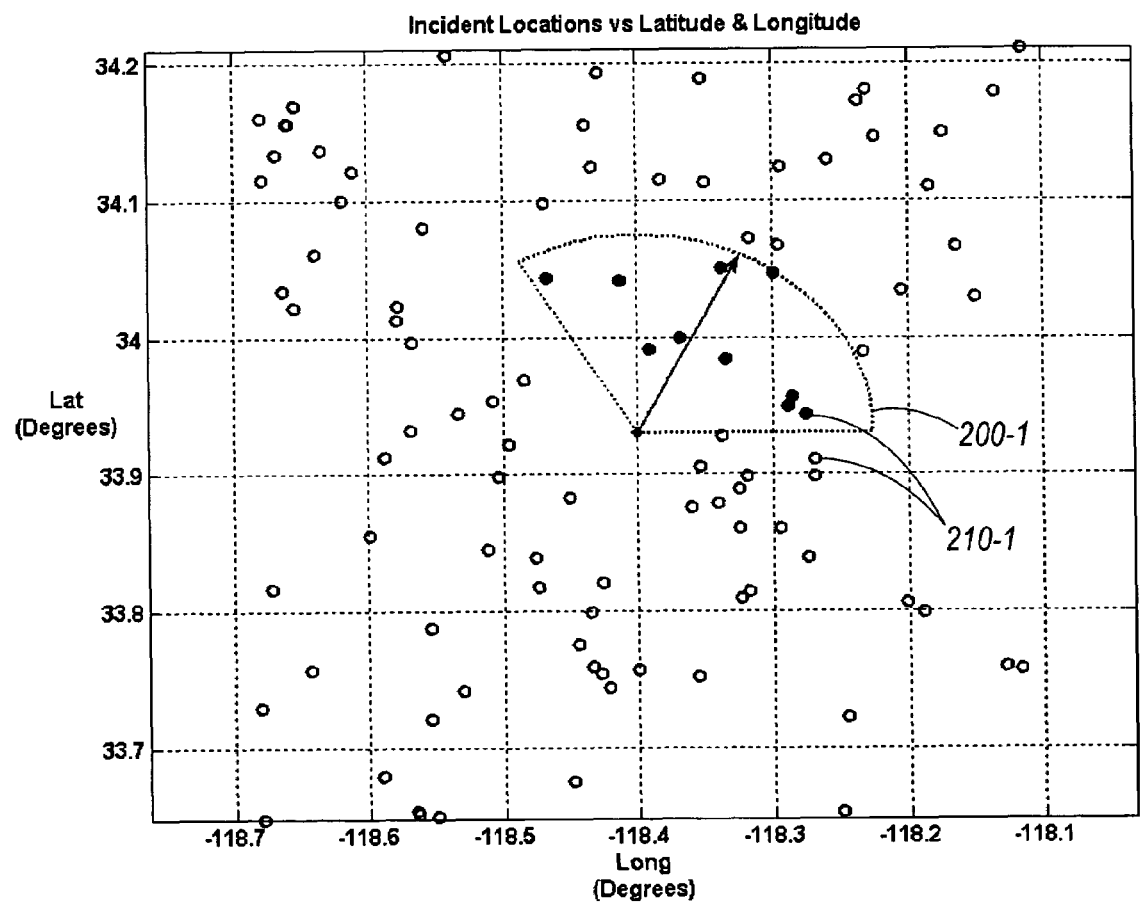
FIG. 3 illustrates an application of another set of exemplary threshold values to define an exemplary zone of interest.

Another exemplary zone of interest is shown in FIG. 3. For ease of reference, the same geographical area is illustrated, with the system having the same current location and heading as the application discussed with reference to FIG. 2. The threshold values shown by a zone of interest (200-1) represent a range threshold value of 10 miles and a bearing threshold of +/−60 degrees. With such a configuration, if the azimuth or heading is taken with respect to the mobile system, the bearing arc that defines the zone of interest (200-1) will be between −30 degrees and 90 degrees. These values are obtained by subtracting and adding the bearing threshold value, or 60 degrees, from or to the current heading value, or 30 degrees. The size of the zone of interest (200-1) also depends on the range threshold value, or 10 miles.

Accordingly, FIG. 3 illustrates that range and bearing threshold values may be selected to define a zone of interest of a desired size. The traffic incident filter 130 (FIG. 1) then determines whether individual points of interest are within the range and bearing threshold and thus the corresponding incident reports should be retained. As previously discussed, this is represented graphically in the figures by the inclusion of points of interest (210) contained within the zone of interest (200-1). Any range threshold values and/or bearing threshold values may be selected to suit the needs of the mobile system. The traffic incident filter (130) uses a filter algorithm to determine whether each incident report should be retained for further processing or discarded. An exemplary filter algorithm used by the traffic incident filter (130) and the filter algorithm's interaction with the controlling program (155) will now be discussed in more detail.

Figure 4:
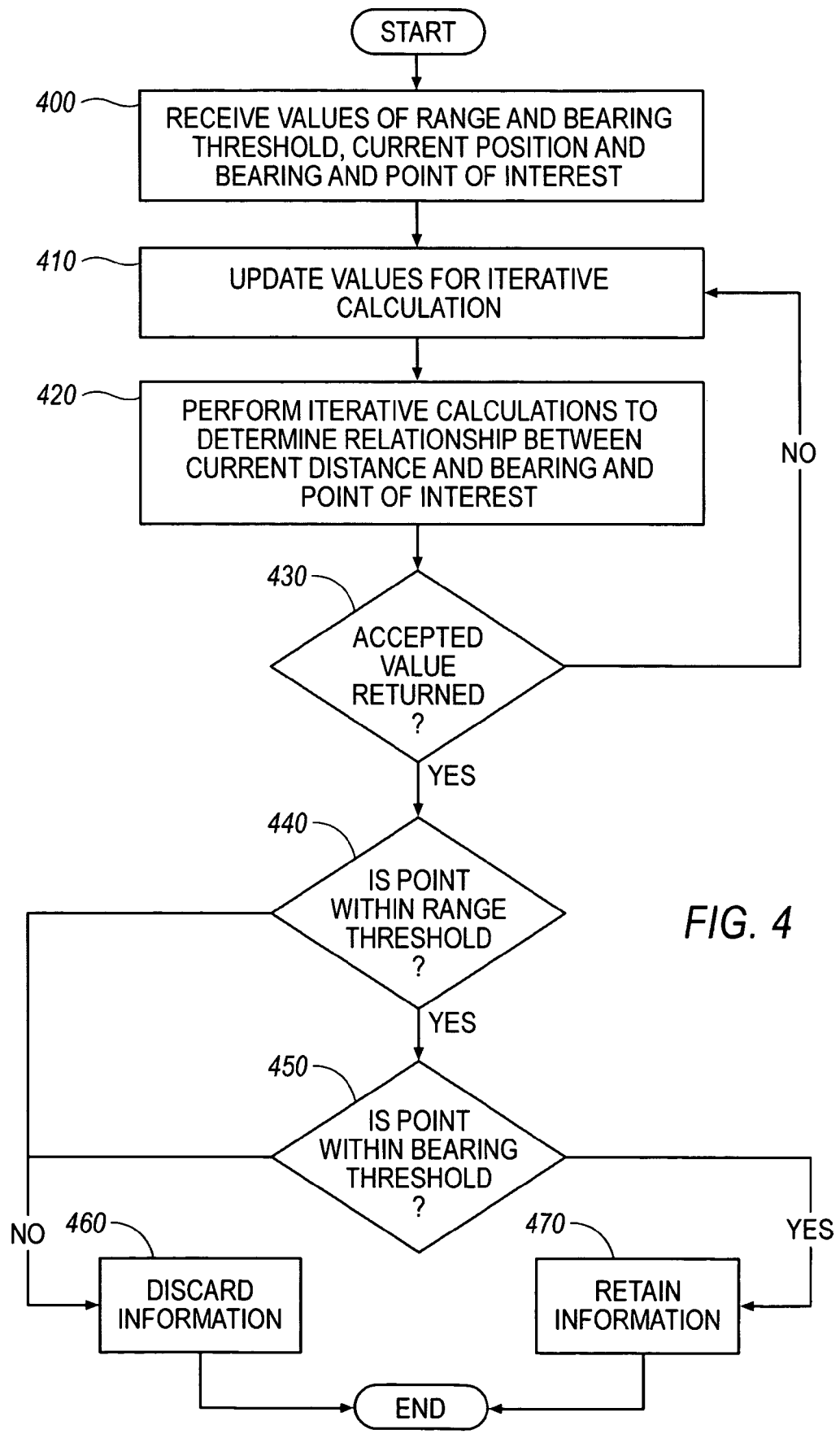
FIG. 4 is a flowchart illustrating an exemplary method of determining whether traffic incident information should be retained.

FIG. 4 is a flowchart of an exemplary filter algorithm showing a method of determining whether an incident report should be retained or discarded. As will be discussed in more detail below, the filter algorithm reduces the processor and/or memory requirements of a traffic management system.

The method begins by receiving values of the range and bearing threshold, the current position and bearing values, and the location of the point of interest (step 400). As previously discussed, the range and bearing threshold values and the current position and bearing values may be conveyed to the traffic incident filter from the controlling program, while the traffic incident information, which includes the incident reports, may be received by the traffic management system and conveyed to the traffic incident filter. Alternatively, the information and values may be conveyed to the traffic incident filter by any suitable method, including the direct reception of all the values and information by the traffic incident filter.

Once the traffic incident filter has received these values, it performs a set of calculations to relate the point of interest to the current position and bearing values. The exemplary determination discussed with reference to FIG. 4 includes a set of iterative calculations. For example, an iterative solution, which may be either direct or inverse, may be used to relate the point of interest to the current location and bearing values. Such an approach is more fully described in "Direct and Inverse Solutions of Geodesics on the Ellipsoid with Application on Nested Equations," VINCENTY, T. Survey Review Vol. XXIII No. 176 April, 1975; which is hereby incorporated by reference in its entirety. A summary of the iterative process will now be briefly discussed.

The iterative process begins by updating the values for the iterative calculation (step 410). On the first iteration, the values used in the calculation are at an initial value. The iterative process then proceeds by performing iterative calculations to determine the relationship, including the distance and bearing, between the current location and the location of the point of interest (step 420). The iterative process narrows the difference between an iterative value and a calculated value until the difference is below a predetermined value. Once this difference is below the predetermined value, an accepted value is returned. If the filter determines that an accepted value has not been returned (NO, determination 430), the calculation values are updated (step 410) and the iterative calculation is again performed (step 420).

Once an accepted value has been returned by the iterative calculation process (YES, determination 430), the accepted value is checked against the range threshold (determination 440). If the point of interest is not within the range threshold (NO, determination 440), the information related to the traffic incident at the point of interest is discarded (step 460).

If the point of interest is within the range threshold (YES, determination 440), the filter algorithm determines whether the point is also within the bearing threshold (determination 450). If the point of interest is not within the bearing threshold, the information is discarded (step 460). If the point of interest is within the bearing threshold (YES, determination 450), the algorithm issues a command to retain the information (step 470) for further processing.

If the traffic incident filter (130) is part of a system similar to that shown in FIG. 1, the traffic management system then stores the incident report in retained memory (185). The processor (150) is then able to selectively access the database in providing geographically relevant traffic incident reports. Further, the traffic management system (110) may be configured to access the GPS module (120) to provide route planning to the user. In particular, the controlling program (155) may be configured to retrieve geographically relevant information, as determined by the threshold values, to suggest alternate routes. Accordingly, the traffic management system (110) may be configured to provide route planning information in addition to providing geographically relevant traffic incident information.

This information may then be output to a navigation system having a visual display. In addition this information may be output by other methods, such as by an audio system, alphanumeric display or other suitable methods.

In conclusion, the exemplary traffic incident filter previously described may be used with satellite radio systems that include traffic management systems. The traffic incident filter allows the traffic management system to present only geographically relevant traffic incident information to the user through the satellite radio system. This configuration reduces the processor and/or memory requirements of the traffic management system, and thus the cost of implementing such a system.

The traffic management system receives information related to traffic incidents across a broad geographical region. This traffic incident information includes the location of each traffic incident. The location of each traffic incident may be referred to as a point of interest. The system uses range and bearing threshold values in determining whether traffic incident information is relevant.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A method for operating a traffic management system on-board a vehicle, said system comprising a controlling program, a traffic incident filter in communication with the controlling program, and a retained memory associated with the controlling program, comprising:
    receiving at least current location information from a global positioning system (GPS) satellite;
    receiving at least a selectable threshold range value;
    relating said selectable threshold range value to said current location information to determine a dynamically variable zone of interest selectable by the user;
    receiving, on-board the vehicle from a satellite digital audio radio service (SDARS) satellite, a broadcast comprising a plurality of incident reports, each said incident report comprising pertinent information and a point of interest based upon a bearing value and a range value;
    correlating data from said broadcast to data stored in a local database using a virtual language;
    processing, by the traffic incident filter on-board the vehicle, each said incident report by comparison to at least one bearing threshold value and at least one range threshold value for determining if the point of interest is within the zone of interest;
    selectively retaining, in the retained memory on-board the vehicle, an incident report for only those points of interest within the zone of interest; and
    purging from the retained memory any incident report that exceeds a staleness parameter selectable by the user.

2. The method of claim 1, wherein said pertinent information corresponds to a traffic incident.

3. The method of claim 2, wherein said method further includes the steps of receiving current heading information and relating said threshold range value to said heading information.

4. The method of claim 3, wherein said method further includes the steps of receiving a threshold bearing value and using the threshold bearing value to determine the zone of interest.

5. The method of claim 1, wherein the broadcast of the plurality of incident reports is received by a satellite radio receiver.

6. The method of claim 4, wherein said current location and heading information comprises information received from a global positioning system.

7. The method of claim 4, wherein said step of receiving current location and heading information and said step of receiving threshold range and bearing values threshold comprises receiving said information and values from a controlling program.

8. The method of claim 2, wherein said traffic incident information contains information from one or more traffic incidents across a broad geographical region.

9. The method of claim 8, wherein said broad geographical region comprises the continental United States.

10. The method of claim 1, wherein the plurality of incident reports are broadcast over a traffic management channel.

11. The method of claim 4, further comprising initially selecting said threshold range and bearing values.

12. A method of managing traffic information by a traffic management system on-board a vehicle, said system comprising a controlling program, a traffic incident filter in communication with the controlling program, and a retained memory associated with the controlling program, comprising:
    establishing selectable threshold range and bearing values;
    receiving current location and heading values from a global positioning system (GPS) satellite;
    dynamically establishing a user selectable zone of interest based on said threshold range and bearing values and said current location and heading values;
    receiving a broadcast on-board the vehicle from a satellite digital audio radio service (SDARS) satellite, said broadcast comprising traffic information having a plurality of incident reports, each incident report having a corresponding point of interest based on a bearing value and range value;
    correlating information from said broadcast to information stored in a local database using a virtual language;
    determining, by said traffic incident filter on-board the vehicle by comparison to at least one threshold range value and threshold bearing value, whether each said incident report is within the zone of interest based upon the point of interest of the incident report;
    retaining said incident report in said retained memory on-board the vehicle only if said corresponding point of interest is within said zone of interest; and
    discarding said incident report when said corresponding point of interest is outside said zone of interest or exceeds a user selectable staleness parameter.

13. The method of claim 12, wherein establishing said threshold range and bearing values comprises receiving input from a user.

14. The method of claim 12, wherein establishing said threshold range and bearing values comprises establishing said range and bearing values as preset values in a processor.

15. A traffic management system located on-board a vehicle, comprising:
    means for receiving a broadcast on-board the vehicle from a satellite digital audio radio service (SDARS) satellite, said broadcast comprising a plurality of incident reports, each said incident report comprising pertinent information and a point of interest calculated from both range and bearing information;
    a traffic incident filter on-board the vehicle configured to receive current location information from a global positioning system (GPS) satellite and a user variable threshold range value, to determine a user selectable dynamically variable zone of interest based upon the current location information, and the threshold range value to determine for each incident report whether the point of interest is within the zone of interest;
    a means for correlating information from said broadcast to information stored in a local database using a virtual language;
    a retained memory on-board the vehicle; and a processor or controlling program on-board the vehicle in communication with said traffic incident filter and said retained memory and configured to retain the incident report in said retained memory if the point of interest of the incident report in within the zone of interest, and to discard the incident report if the point of interest is outside the zone of interest or if an incident report exceeds a user selectable staleness parameter.

16. The system of claim 15, further comprising a global positioning module configured to provide current location and heading values for use by said traffic incident filter.

17. The system of claim 16, wherein said traffic incident filter is configured to receive heading information and bearing values and to use said heading information and bearing values to determine the zone of interest.

18. The system of claim 15, and further comprising a database coupled to said processor, wherein said database includes lists of weather and traffic situations, advice, and duration stored thereon.

19. The system of claim 18, wherein said database further includes lists of locations, including intersections, road numbers, and place names stored thereon.

20. The system of claim 15, wherein the means for receiving the broadcast comprises a satellite radio receiver.

* * * * *